United States Patent
Lee et al.

(10) Patent No.: US 12,166,252 B2
(45) Date of Patent: Dec. 10, 2024

(54) POLYMER ELECTROLYTE MEMBRANE, MEMBRANE-ELECTRODE ASSEMBLY INCLUDING SAME, AND METHOD FOR MEASURING DURABILITY THEREOF

(71) Applicant: KOLON INDUSTRIES, INC., Seoul (KR)

(72) Inventors: Eunsu Lee, Seoul (KR); Donghoon Lee, Seoul (KR); Nayoung Kim, Seoul (KR); Junghwa Park, Seoul (KR); Hyesong Lee, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 0 days.

(21) Appl. No.: 17/769,740

(22) PCT Filed: Dec. 23, 2020

(86) PCT No.: PCT/KR2020/018954
§ 371 (c)(1),
(2) Date: Apr. 16, 2022

(87) PCT Pub. No.: WO2021/133044
PCT Pub. Date: Jul. 1, 2021

(65) Prior Publication Data
US 2022/0393214 A1    Dec. 8, 2022

(30) Foreign Application Priority Data
Dec. 26, 2019 (KR) .......... 10-2019-0175274

(51) Int. Cl.
*H01M 8/1067* (2016.01)
*H01M 8/10* (2016.01)
(Continued)

(52) U.S. Cl.
CPC ....... *H01M 8/1067* (2013.01); *H01M 8/1004* (2013.01); *H01M 8/1058* (2013.01); *H01M 2008/1095* (2013.01)

(58) Field of Classification Search
CPC ............. H01M 8/1067; H01M 8/1004; H01M 8/1058; H01M 2008/1095; H01M 8/04313
See application file for complete search history.

(56) References Cited

U.S. PATENT DOCUMENTS

| 6,110,333 A * | 8/2000 | Spethmann et al. .. H01M 8/106 204/252 |
| 2010/0009236 A1* | 1/2010 | Kotera et al. ....... H01M 8/1067 429/494 |
| 2017/0005356 A1* | 1/2017 | Zimmerman .......... H01M 4/24 |

FOREIGN PATENT DOCUMENTS

| CN | 1217004 A | 5/1999 |
| CN | 1949574 A | 4/2007 |

(Continued)

OTHER PUBLICATIONS

Jeong et al., "KR20190131687A English Translation", Nov. 27, 2019.*

(Continued)

*Primary Examiner* — Matthew T Martin
*Assistant Examiner* — Alexandra J Simmons
(74) *Attorney, Agent, or Firm* — Harvest IP Law, LLP (57) ABSTRACT

Disclosed are: a polymer electrolyte membrane which can guarantee the production of a membrane-electrode assembly having excellent mechanical properties without a decrease in performance, such as in ionic conductivity, and thus having a high enough durability to achieve at least 30,000 wet/dry cycles as measured according to the NEDO protocol; a membrane-electrode assembly including the polymer electrolyte membrane; and a method for measuring the durabil- (Continued)

ity of the membrane-electrode assembly. The polymer electrolyte membrane according to the present invention comprises a composite layer including: a porous support having multiple pores; and ionomers filling the pores, and has an MD internal tearing strength of 150 N/mm or greater, a TD internal tearing strength of 150 N/mm or greater, a stab initial strain of 8% or less, and a stab final strain of 10% or less.

7 Claims, 1 Drawing Sheet

(51) Int. Cl.
  *H01M 8/1004* (2016.01)
  *H01M 8/1058* (2016.01)

(56) References Cited

FOREIGN PATENT DOCUMENTS

| | | | |
|---|---|---|---|
| CN | 105144454 A | 12/2015 | |
| CN | 105849959 A | 8/2016 | |
| CN | 107009706 A | 8/2017 | |
| JP | 2002-313363 A | 10/2002 | |
| JP | 2003-203648 A | 7/2003 | |
| JP | 2005-276747 A | 10/2005 | |
| JP | 2007109657 A | 4/2007 | |
| JP | 2010170823 A | 8/2010 | |
| JP | 2013108092 A | 6/2013 | |
| JP | 2019518588 A | 7/2019 | |
| KR | 20090032131 A | 3/2009 | |
| KR | 101877753 B1 | 7/2018 | |
| KR | 20190131687 A * | 11/2019 | ............ H01M 8/106 |
| WO | 2019217791 A2 | 11/2019 | |

OTHER PUBLICATIONS

The office action dated Apr. 26, 2023 related to the corresponding Japanese Patent application.
The office action dated Oct. 12, 2023 related to the corresponding Chinese Patent application.

* cited by examiner

POLYMER ELECTROLYTE MEMBRANE, MEMBRANE-ELECTRODE ASSEMBLY INCLUDING SAME, AND METHOD FOR MEASURING DURABILITY THEREOF

CROSS REFERENCE TO RELATED APPLICATIONS

This application is a National Stage of International Application No. PCT/KR2020/018954 filed Dec. 23, 2020, claiming priority based on Korean Patent Application No. 10-2019-0156903 filed Nov. 29, 2019, Korean Patent Application No. 10-2019-0175274 filed Nov. 29, 2019 and Korean Patent Application No. 10-2019-0157214 filed Dec. 26, 2019, the disclosures of which are incorporated herein by reference in their entireties.

TECHNICAL FIELD

The present disclosure relates to a polymer electrolyte membrane, a membrane-electrode assembly including the same, and a method of measuring durability thereof, and more particularly to a polymer electrolyte membrane having excellent mechanical properties without degradation in performance, such as ionic conductivity, whereby it is possible to guarantee manufacture of a membrane-electrode assembly having a high durability of 30,000 wet/dry cycles or more measured according to the NEDO protocol, a membrane-electrode assembly including the same, and a method of measuring durability thereof.

BACKGROUND ART

A fuel cell, which is a cell including a power generation system for directly converting chemical reaction energy into electrical energy through an oxidation/reduction reaction of hydrogen and oxygen contained in a hydrocarbon-based fuel material, such as methanol, ethanol, or natural gas, has attracted attention as a next-generation clean energy source that is capable of replacing fossil energy due to the environmentally friendly characteristics thereof, such as high energy efficiency and reduced discharge of contaminants.

Such a fuel cell has an advantage in that unit cells are stacked to constitute a stack, whereby it is possible to provide various levels of power. In addition, the fuel cell has energy density 4 to 10 times that of a small-sized lithium battery, whereby the fuel cell has attracted attention as a small-sized power supply or a mobile power supply.

The stack of the fuel cell, which substantially generates electricity, has a structure in which several to several tens of unit cells, each of which includes a membrane-electrode assembly (MEA) and a separator (also referred to as a bipolar plate), are stacked, and the membrane-electrode assembly is generally configured to have a structure in which an anode (also referred to as a "fuel electrode") and a cathode (also referred to as an "air electrode") are formed at opposite sides of an electrolyte membrane in the state in which the electrolyte membrane is disposed therebetween.

The fuel cell may be classified as an alkaline electrolyte membrane fuel cell or a polymer electrolyte membrane fuel cell (PEMFC) depending on the state and kind of an electrolyte. The polymer electrolyte membrane fuel cell has attracted attention as a mobile power supply, a power supply for vehicles, and a power supply for home use due to a low operating temperature lower than 100° C., rapid starting and response characteristics, and excellent durability thereof.

Representative examples of the polymer electrolyte membrane fuel cell may include a proton exchange membrane fuel cell (PEMFC), which uses hydrogen gas as fuel, and a direct methanol fuel cell (DMFC), which uses liquid methanol as fuel.

The reaction that occurs in the polymer electrolyte membrane fuel cell will be described in brief. First, when fuel such as hydrogen gas is supplied to the anode, hydrogen ions ($H^+$) and electrons ($e^-$) are generated at the anode as the result of the oxidation reaction of hydrogen. The generated hydrogen ions are transferred to the cathode via a polymer electrolyte membrane, and the generated electrons are transferred to the cathode via an external circuit. At the cathode, to which oxygen is supplied, oxygen is bonded with the hydrogen ions and the electrons, and water is generated as the result of the reduction reaction of the oxygen.

Meanwhile, there are many technical problems to be solved in order to realize commercial use of the polymer electrolyte membrane fuel cell, and it is essentially necessary to realize high performance, a long lifespan, and a reduction in the price of the polymer electrolyte membrane fuel cell. The element that exerts the greatest influence thereon is the membrane-electrode assembly, and the polymer electrolyte membrane is one of the core factors that exert the greatest influence on the performance and price of the membrane-electrode assembly.

In particular, for a membrane-electrode assembly applied to a fuel cell for transportation, it is most important to secure mechanical durability of the membrane-electrode assembly for long-term operation thereof. In general, mechanical durability of the membrane-electrode assembly substantially depends on durability of the polymer electrolyte membrane that repeatedly expands and contracts during driving of the fuel cell.

In order to increase mechanical durability of the polymer electrolyte membrane, a reinforced composite membrane type polymer electrolyte membrane manufactured by impregnating a porous support with an ionomer dispersion has been proposed. As the thickness of the porous support is increased, however, electrical performance, such as ionic conductivity, of the polymer electrolyte membrane is lowered. For this reason, it is not possible to increase the thickness of the porous support without limit, and therefore there is a limitation in improving mechanical durability of the polymer electrolyte membrane through adjustment in thickness of the porous support.

Meanwhile, mechanical durability of the membrane-electrode assembly is generally evaluated by measuring the number of wet/dry cycles according to the NEDO protocol. However, there is a problem that it takes a long time (50 days or more) for such evaluation. Furthermore, a membrane-electrode assembly sample must be actually manufactured in order to evaluate the durability of the membrane-electrode assembly, and therefore (i) it takes also a lot of time to manufacture the membrane-electrode assembly sample necessary for the durability evaluation, and (ii) it costs too much to manufacture the membrane-electrode assembly sample since a precious metal is used in order to form electrodes.

DISCLOSURE

Technical Problem

It is an object of the present disclosure to provide a polymer electrolyte membrane having excellent mechanical properties without degradation in performance, such as ionic conductivity, whereby it is possible to guarantee manufacture of a membrane-electrode assembly having a high durability of 30,000 wet/dry cycles or more measured according to the NEDO protocol.

It is another object of the present disclosure to provide a membrane-electrode assembly including a polymer electrolyte membrane having excellent mechanical properties without degradation in performance, such as ionic conductivity, thereby having a high durability of 30,000 wet/dry cycles or more measured according to the NEDO protocol.

It is a further object of the present disclosure to provide a method of measuring durability of a polymer electrolyte membrane capable of checking mechanical durability of the polymer electrolyte membrane without actual manufacture of the membrane-electrode assembly, whereby it is possible to considerably reduce time and cost necessary for research and development of the membrane-electrode assembly and a fuel cell.

Technical Solution

In accordance with an aspect of the present disclosure, there is provided a polymer electrolyte membrane including a composite layer including a porous support having a plurality of pores and an ionomer with which the pores are filled, wherein the polymer electrolyte membrane has an MD tear strength of 150 N/mm or more, a TD tear strength of 150 N/mm or more, a stab initial strain of 8% or less, and a stab final strain of 10% or less.

The polymer electrolyte membrane may have an in-plane ionic conductivity of 0.03 to 0.1 S/cm and a through-plane ionic conductivity of 0.03 to 0.1 S/cm under conditions of 80° C. and 50% RH.

The polymer electrolyte membrane may have an MD tear strength of 170 to 320 N/mm, a TD tear strength of 160 to 320 N/mm, a stab initial strain of 1 to 6%, and a stab final strain of 2 to 8%.

The composite layer may have a first surface and a second surface opposite the first surface, the polymer electrolyte membrane may further include a first resin layer disposed on the first surface, the first resin layer including a first ionomer, and a second resin layer disposed on the second surface, the second resin layer including a second ionomer, and at least a portion of the ionomer in the composite layer may be an ionomer identical to at least one of the first ionomer and the second ionomer.

The thickness of the polymer electrolyte membrane may be 10 to 50 μm, and the thickness of the composite layer may be 30 to 90% of the thickness of the polymer electrolyte membrane.

The porous support may include a first porous sub-support having the first surface and a second porous sub-support having the second surface, the first porous sub-support may have first pores, the first pores being filled with an ionomer identical to the first ionomer, and the second porous sub-support may have second pores, some of the second pores adjacent to the first porous sub-support being filled with an ionomer identical to the first ionomer, the remainder of the second pores adjacent to the second resin layer being filled with an ionomer identical to the second ionomer.

The first and second porous sub-supports may be in contact with each other.

The porous support may include a first porous sub-support having the first surface, a second porous sub-support having the second surface, and at least one third porous sub-support disposed between the first and second porous sub-supports, and the first, second, and third porous sub-supports may be in contact with each other.

The first ionomer may be identical to or different from the second ionomer.

In accordance with another aspect of the present disclosure, there is provided a membrane-electrode assembly including an anode, a cathode, and the polymer electrolyte membrane according to claim 1, the polymer electrolyte membrane being disposed between the anode and the cathode.

In accordance with a further aspect of the present disclosure, there is provided a method of measuring durability of a polymer electrolyte membrane, the method including taking a sample having a predetermined size and shape from the polymer electrolyte membrane, fixing the sample to a holder for puncture testing according to ASTM F1342, repeatedly stabbing the sample using a probe for puncture testing according to ASTM F1342 at a predetermined load and a predetermined speed, measuring displacement of the sample after each stab, and calculating stab strain using at least one of the measured displacements.

The calculating stab strain may include calculating stab initial strain according to Equation 1 below and calculating stab final strain according to Equation 2 below:

$$IS(\%)=[(D_2-D_1)/D_1]\times 100 \qquad \text{[Equation 1]}:$$

$$FS(\%)=[(D_{20}-D_1)/D_1]\times 100 \qquad \text{[Equation 2]}:$$

where IS indicates the stab initial strain, FS indicates the stab final strain, $D_1$ indicates displacement (mm) caused by a first stab, $D_2$ indicates displacement (mm) caused by a second stab, and $D_{20}$ indicates displacement (mm) caused by a twentieth stab.

The sample may have a square shape of 50 mm×50 mm, the predetermined load may be 10 N, and the predetermined speed may be 100 mm/min.

The method may be performed at a temperature of 23±2° C. and a relative humidity of 50±5%.

An initial load applied to the sample may be 0.2 N.

Advantageous Effects

According to the present disclosure, it is possible to provide a polymer electrolyte membrane with improved impregnability of an ionomer in a porous support. Consequently, the polymer electrolyte membrane according to the present disclosure has not only excellent electrical performance such as ionic conductivity but also high tear strength and stab resistance, thereby exhibiting improved mechanical durability.

In particular, the polymer electrolyte membrane according to the present disclosure has tear strength and stab strain within the ranges as defined by the present disclosure, whereby it is possible to guarantee manufacture of a membrane-electrode assembly having a high durability of 30,000 wet/dry cycles or more as measured according to the NEDO protocol.

In addition, according to the present disclosure, it has been found that not only tear strength but also stab strain of the polymer electrolyte membrane is directly related to wet/dry cycle according to the NEDO protocol, which is generally measured in order to evaluate mechanical durability of the membrane-electrode assembly. Therefore, mechanical durability of a membrane-electrode assembly to be manufactured using a polymer electrolyte membrane can be easily predicted even before actual production thereof, by measuring tear strength and stab strain of the polymer electrolyte membrane as it is prepared. As a result, it is possible to considerably reduce time and cost necessary for research and development of the membrane-electrode assembly and a fuel cell.

BEST MODE

Hereinafter, embodiments of the present disclosure will be described in detail with reference to the accompanying drawings.

Figure 1:
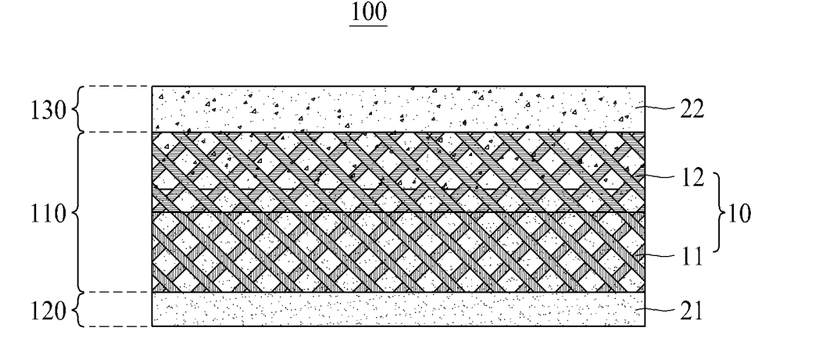
FIG. 1 is a sectional view of a polymer electrolyte membrane according to an embodiment of the present disclosure.

FIG. 1 is a sectional view of a polymer electrolyte membrane 100 according to an embodiment of the present disclosure.

As illustrated in FIG. 1, the polymer electrolyte membrane 100 according to the present disclosure includes a composite layer 110 including a porous support 10 having a plurality of pores and an ionomer 21/22 with which the pores are filled.

The porous support 10 may include a perfluorinated polymer having high resistance to thermal and chemical decomposition (e.g., polytetrafluoroethylene (PTFE) or a copolymer of polytetrafluoroethylene and $CF_2=CFC_nF_{2n+1}$ (n is a real number of 1 to 5) or $CF_2=CFO-(CF_2CF(CF_3)O)_mC_nF_{2n+1}$ (m is a real number of 0 to 15 and n is a real number of 1 to 15)). As a non-exclusive example, an expanded polytetrafluoroethylene film (e-PTFE film), which is commercially available, may be used as the porous support 10.

Alternatively, the porous support 10 may be a nonwoven web made of a hydrocarbon-based polymer. For example, the porous support 10 may be a nanoweb in which nanofibers having an average diameter of 40 to 5000 nm are randomly arranged. The hydrocarbon-based polymer may be a polymer that has excellent chemical resistance and that has no risk of deformation due to moisture in a high humidity environment, such as aliphatic polyamide, aromatic polyamide, polyimide, polyetherimide, polyacrylonitrile, polyaniline, polyethylene oxide, polyethylene naphthalate, polybutylene terephthalate, styrene butadiene rubber, polystyrene, polyvinyl chloride, polyvinyl alcohol, polyvinylidene fluoride, polyvinyl butylene, polyurethane, polybenzoxazole, polybenzimidazole, polyamide imide, polyethylene terephthalate, polyphenylene sulfide, polyethylene, polypropylene, a copolymer of two or more thereof, or a mixture of two or more thereof. In particular, polyimide is one of preferred candidate materials for forming the porous support 10 in that it has excellent heat resistance, chemical resistance, and dimensional stability.

The porosity of the porous support 10 may be 45% or more, preferably 50% or more, more preferably 60 to 90%. If the porosity of the porous support 10 is less than 45%, the amount of the ionomer in the porous support 10 is too small, whereby ionic conductivity of the polymer electrolyte membrane 100 is lowered. If the porosity of the porous support 10 is greater than 90%, on the other hand, the intended reinforcement function of the porous support may be deteriorated, and dimensional stability of the porous support may be lowered, and therefore subsequent processes may not be smoothly performed.

The ionomer 21/22 is a cationic conductor having a cation exchange group or an anionic conductor having an anion exchange group.

The cationic conductor may be a fluorine-based polymer including at least one cation exchange group selected from the group consisting of a sulfonic acid group, a carboxyl group, a boronic acid group, a phosphate group, an imide group, a sulfonimide group, a sulfonamide group, a sulfonic acid fluoride group, and a derivative thereof. For example, the cationic conductor may be, but is not limited to, poly(perfluorosulfonic acid), poly(perfluorocarboxylic acid), a copolymer of tetrafluoroethylene including a sulfonic acid group and fluorovinyl ether, defluorinated polyetherketone sulfide, or a mixture of two or more thereof.

Alternatively, the cationic conductor may be a hydrocarbon-based polymer including at least one cation exchange group selected from the group consisting of a sulfonic acid group, a carboxyl group, a boronic acid group, a phosphate group, an imide group, a sulfonimide group, a sulfonamide group, a sulfonic acid fluoride group, and a derivative thereof. For example, the cationic conductor may be, but is not limited to, sulfonated polyimide (S-PI), sulfonated polyarylether sulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, or a mixture of two or more thereof.

The anionic conductor is a polymer capable of transferring anions, such as hydroxyl ions, carbonate, or bicarbonate. A polymer doped with metal hydroxide may generally be used as the anionic conductor. Specifically, poly(ether sulfone), polystyrene, a vinyl-based polymer, poly(vinyl chloride), poly(vinylidene fluoride), poly(tetrafluoroethylene), poly(benzimidazole), or poly(ethylene glycol), which is doped with metal hydroxide, may be used as the anionic conductor.

The polymer electrolyte membrane 100 according to the present disclosure has an MD tear strength of 150 N/mm or more (e.g., 170 to 320 N/mm) and a TD tear strength of 150 N/mm or more (e.g., 160 to 320 N/mm).

"MD" and "TD", which are terms used in this specification, mean "machine direction" and "traverse direction", respectively. "Machine direction" is a direction in which the polymer electrolyte membrane 100 is moved when manufactured, and "traverse direction" is a direction perpendicular to "machine direction".

In the present disclosure, "tear strength" of the polymer electrolyte membrane 100 is measured as follows.

[Tear Strength]

A sample of 50 mm×50 mm is taken, and the maximum force applied to the sample until the sample is torn is measured under the following conditions according to ASTM D624 using a universal test machine (UTM) (Instron 5966).

Temperature: 23±2° C.
Relative humidity: 50±5%
Test speed: 500±50 mm/min

Subsequently, tear strength of the sample is calculated using Equation 3 below.

$$TS=F/d \qquad \text{[Equation 3]:}$$

Where TS indicates tear strength (N/mm) of the sample, F indicates the maximum force (N) applied to the sample, and d indicates a median thickness (mm), which is the arithmetic mean of thicknesses of the sample measured at three points of the sample in a central portion thereof.

According to the aforementioned manner, tear strengths of five samples are respectively measured, and the arithmetic mean thereof is calculated, whereby tear strength of the polymer electrolyte membrane 100 is obtained.

Even though the polymer electrolyte membrane 100 has the above-specified ranges of MD tear strength and TD tear strength, a membrane-electrode assembly manufactured using the polymer electrolyte membrane 100 according to a conventional method does not always satisfy high durability required by the industry (i.e., wet/dry cycles measured according to the NEDO protocol>30,000 times). In other words, an MD tear strength of 150 N/mm or more and a TD tear strength of 150 N/mm or more are necessary conditions for satisfying 30,000 wet/dry cycles or more, rather than sufficient conditions therefor.

Even though the polymer electrolyte membrane 100 has an MD tear strength of 150 N/mm or more and a TD tear strength of 150 N/mm or more, therefore, it is required to actually manufacture a membrane-electrode assembly sample and to perform a durability test according to the NEDO protocol in order to check whether a membrane-electrode assembly manufactured using the polymer electrolyte membrane according to a conventional method has sufficient durability. This requires a lot of time and causes cost increase.

According to the present disclosure, it has been found that, when a polymer electrolyte membrane 100 having an MD tear strength of 150 N/mm or more and a TD tear strength of 150 N/mm or more has a certain degree of stab resistance, a membrane-electrode assembly manufactured using the polymer electrolyte membrane according to a conventional method always satisfies 30,000 wet/dry cycles or more. According to the present disclosure, therefore, stab resistance of the polymer electrolyte membrane 100 as well as tear strength thereof are measured, whereby it is possible to check whether the membrane-electrode assembly would satisfy mechanical durability required by the industry without actual production thereof. As a result, it is possible to considerably reduce time and cost necessary for research and development of the membrane-electrode assembly and a fuel cell.

A method of measuring durability of the polymer electrolyte membrane 100 according to the present disclosure includes a step of taking a sample having a predetermined size and shape from the polymer electrolyte membrane 100, a step of fixing the sample to a holder for puncture testing according to ASTM F1342, a step of repeatedly stabbing the sample using a probe for puncture testing according to ASTM F1342 at a predetermined load and a predetermined speed, a step of measuring displacement of the sample after each stab, and a step of calculating stab strain using at least one of the measured displacements.

In the embodiment of the present disclosure, the stab strain calculating step may include a step of calculating stab initial strain and a step of calculating stab final strain.

More specifically, in the present disclosure, "stab initial strain" and "stab final strain" of the polymer electrolyte membrane 100 are measured as follows.

[Stab Initial Strain and Stab Final Strain]

A sample of 50 mm×50 mm is taken, and stab resistance of the sample is measured using a universal test machine (UTM) (Instron 5966). A jig for puncture testing (sample holder and probe) according to ASTM F1342 provided by Instron Company is used as an accessory for repeated stabs. Specifically, stabs (load: 10 N) are repeatedly performed using the probe under the following conditions while the sample is fixed to the holder (the distance from a base level to the sample: 100 mm), and a decrease in the distance (i.e., "displacement") due to each stab is respectively measured. At this time, displacement when a load of 0.2 N is applied is regarded as a zero point.

Temperature: 23±2° C.
Relative humidity: 50±5%
Mode: Compression mode
Cycle period: 20 times
Test speed: 100 mm/min Strain when stabs (load: 10 N) are repeatedly performed twice using the probe (i.e., "stab initial strain") and strain when stabs (load: 10 N) are repeatedly performed 20 times using the probe (i.e., "stab final strain") are calculated by Equations 1 and 2 below, respectively.

$$IS(\%)=[(D_2-D_1)/D_1]\times 100 \qquad \text{[Equation 1]}:$$

$$FS(\%)=[(D_{20}-D_1)/D_1]\times 100 \qquad \text{[Equation 2]}:$$

Where IS indicates stab initial strain, FS indicates stab final strain, $D_1$ indicates displacement (mm) due to a first stab, $D_2$ indicates displacement (mm) due to a second stab, and $D_{20}$ indicates displacement (mm) due to a twentieth stab.

The polymer electrolyte membrane 100 according to the present disclosure has the above-specified ranges of MD/TD tear strengths and stab initial/final strains, and thus would assure a highly durable membrane-electrode assembly having wet/dry cycles of 30,000 or more as measured according to the NEDO protocol.

That is, it has been found by the present disclosure that MD/TD tear strength and stab initial/final strain of the polymer electrolyte membrane 100 are directly related to wet/dry cycle according to the NEDO protocol, which is generally measured in order to evaluate mechanical durability of the membrane-electrode assembly. Therefore, mechanical durability of a membrane-electrode assembly to be manufactured using a polymer electrolyte membrane 100 can be easily predicted even before actual production thereof, by measuring tear strength and stab strain of the polymer electrolyte membrane 100 as it is prepared. As a result, it is possible to considerably reduce time and cost necessary for research and development of the membrane-electrode assembly and the fuel cell.

In the embodiment of the present disclosure, the polymer electrolyte membrane 100 may have an in-plane ionic conductivity of 0.03 to 0.1 S/cm, e.g., 0.046 to 0.1 S/cm, and a through-plane ionic conductivity of 0.03 to 0.1 S/cm, e.g., 0.042 to 0.1 S/cm, under conditions of 80° C. and 50% RH. Detailed reasons that the polymer electrolyte membrane 100 according to the present disclosure has high ionic conductivity while having excellent mechanical properties will be described later.

That is, the polymer electrolyte membrane 100 according to the embodiment of the present disclosure has excellent mechanical properties (i.e., an MD tear strength of 150 N/mm or more, a TD tear strength of 150 N/mm or more, a stab initial strain of 8% or less, and a stab final strain of 10% or less) without degradation in performance, such as ionic conductivity, whereby it is possible to guarantee manufacture of a membrane-electrode assembly having excellent electrical performance while having a high durability of 30,000 wet/dry cycles or more.

In the present disclosure, in-plane ionic conductivity and through-plane ionic conductivity are measured using the following methods.

[In-Plane Ionic Conductivity]

In-plane ionic conductivity of the polymer electrolyte membrane 100 is measured at 80° C. and 50% RH using a magnetic suspension balance apparatus (Bell Japan Company).

[Through-Plane Ionic Conductivity]

Through-plane ionic conductivity of the polymer electrolyte membrane 100 is measured using a through-plane membrane test system (Scribner Associates, MTS 740) according to a constant current four-terminal method. Specifically, an alternating current potential difference generated in a sample (10 mm×30 mm) is measured while applying alternating current to opposite sides of the sample under conditions of 80° C. and 50% RH to obtain membrane resistance R (a). Subsequently, through-plane ionic conductivity of the polymer electrolyte membrane 100 is calculated using Equation 4 below.

$$\sigma = L/[R \times A] \quad \text{[Equation 4]:}$$

(wherein σ indicates through-plane ionic conductivity (S/cm), L indicates the distance (cm) between electrodes, R indicates membrane resistance (Ω), and A indicates effective area ($cm^2$) of the membrane.)

As illustrated in FIG. 1, according to the embodiment of the present disclosure, the composite layer 110 may have a first surface and a second surface opposite the first surface, and the polymer electrolyte membrane 100 may further include a first resin layer 120 disposed on the first surface and a second resin layer 130 disposed on the second surface.

The first resin layer 120 may include the first ionomer 21, and the second resin layer 130 may include the second ionomer 22.

At least a portion of the ionomer in the composite layer 110 may be an ionomer identical to at least one of the first ionomer 21 and the second ionomer 22.

The thickness of the polymer electrolyte membrane 100 may be 10 to 50 and the thickness of the composite layer 110 may be 30 to 90%, preferably 35 to 85%, more preferably 40 to 80%, of the thickness of the polymer electrolyte membrane 100. If the thickness percentage of the composite layer 110 is less than 30%, the effects of improving mechanical durability and dimensional stability of the polymer electrolyte membrane 100 due to use of the porous support 10 are insignificant. On the other hand, if the thickness percentage of the composite layer 110 is greater than 90%, the thicknesses of the first and second resin layers 120 and 130 are two small, and thus ionic conductivity of the polymer electrolyte membrane 100 is lowered.

As illustrated in FIG. 1, the porous support 10 according to the embodiment of the present disclosure includes a first porous sub-support 11 and a second porous sub-support 12.

The first porous sub-support 11 has the first surface of the composite layer 110. That is, one surface of the first porous sub-support 11 constitutes the first surface of the composite layer 110. Similarly, the second porous sub-support 12 has the second surface of the composite layer 110. That is, one surface of the second porous sub-support 12 constitutes the second surface of the composite layer 110.

The first and second porous sub-supports 11 and 12 may be the same kind of supports or different kinds of supports. For example, both the first and second porous sub-supports 11 and 12 may be e-PTFE films or nonwoven webs. When both the first and second porous sub-supports 11 and 12 are e-PTFE films, the sub-supports may be stacked in such a way that expansion directions thereof are perpendicular to each other.

As illustrated in FIG. 1, the first and second porous sub-supports 11 and 12 may be in contact with each other. Since the first and second porous sub-supports 11 and 12 are in tight contact with each other, it may be impossible to visually check the interface therebetween, unless the sub-supports are different kinds of porous supports distinguishable from each other. That is, the porous support 19 may be an apparent single porous support.

The polymer electrolyte membrane 100 according to the embodiment of the present disclosure having the first and second porous sub-supports 11 and 12 provides many advantages in several terms, compared to a polymer electrolyte membrane reinforced by an actual single porous support having the same thickness as the porous support 10 (i.e., an actual single porous support providing the same or similar mechanical properties as or to the porous support 10). For example, according to the embodiment of the present disclosure, compared to the case in which an actual single porous support having the same thickness as the porous support 10 is impregnated with an ionomer, (i) since, in an ionomer impregnation process, the surface area of the porous support 10 that directly contacts the ionomer is large, the wetting of the porous support 10 by an ionomer solution or dispersion is good, and thus it is possible to minimize the reduction of ionic conductivity of the polymer electrolyte membrane 100 due to the use of the support (i.e., air in the pores of the support is better discharged and the empty spaces are filled with the ionomer, whereby remaining of microbubbles badly affecting ionic conductivity in the final polymer electrolyte membrane can be prevented, and therefore a water channel, which is a moving path for hydrogen ions, can be well formed in the through-plane direction of the support), and (ii) since the area capable of reducing deformation of the polymer electrolyte membrane is increased, the stab strain of the polymer electrolyte membrane can be further lowered (i.e., stab resistance may be improved).

As a result, the polymer electrolyte membrane 100 according to the embodiment of the present disclosure having the first and second porous sub-supports 11 and 12 may have excellent mechanical properties without degradation in performance, such as ionic conductivity.

The first porous sub-support 11 may have a plurality of first pores, wherein the first pores may be filled with the same ionomer as the first ionomer 21 of the first resin layer 120.

The second porous sub-support 12 may have a plurality of second pores, wherein some of the second pores adjacent to the first porous sub-support 11 may be filled with the same ionomer as the first ionomer 21 of the first resin layer 120, and the remainder of the second pores adjacent to the second resin layer 130 may be filled with the same ionomer as the second ionomer 22 of the second resin layer 130.

That is, in the embodiment of the present disclosure, since the interface between the first and second ionomers 21 and 22 is present in the second porous sub-support 12 (i.e., since the first ionomer 21 present in the second porous sub-support 12 functions as an anchor), an adhesive force between the first and second porous sub-supports 11 and 12, which is as strong as that of a stack structure having porous supports bonded to each other by means of an adhesive and/or hot press, can be secured, and thus any deterioration of ion conductivity which might be caused due to the use of an adhesive and/or hot press for bonding the supports can be prevented. Consequently, the polymer electrolyte membrane 100 according to the embodiment of the present disclosure may have excellent mechanical properties without degradation in performance, such as ionic conductivity.

The first ionomer 21 may be identical to or different from the second ionomer 22.

Hereinafter, a method of manufacturing the polymer electrolyte membrane 100 according to the embodiment of the present disclosure illustrated in FIG. 1 will be described in detail.

The method according to the embodiment of the present disclosure includes (i) casting a first mixed liquid including a first ionomer 21, (ii) placing a first porous sub-support 11 in a dry state on the first mixed liquid such that the first porous sub-support 11 becomes entirely wet state, (iii) immediately after the first porous sub-support 11 becomes entirely wet state, adding a second porous sub-support 12 in a dry state on the first porous sub-support 11 such that the first and second porous sub-supports 11 and 12 are in contact with each other, (iv) applying a second mixed liquid including a second ionomer 22 to the second porous sub-support 12 such that the second porous sub-support 12 becomes entirely wet state, and (v) drying the first and second porous sub-supports 11 and 12 which are in the wet state.

The second porous sub-support 12 may be added on the first porous sub-support 11 while the first porous sub-support is maintained in the entirely wet state by the first mixed liquid, whereby some of the second pores of the second porous sub-support 12 may be filled with the first mixed liquid. As previously described, therefore, the first ionomer 21 present in some of the second pores of the second porous sub-support 12 functions as an anchor, whereby strong adhesive force between the first and second porous sub-supports 11 and 12 can be secured, and mechanical properties of the polymer electrolyte membrane 100 can be remarkably improved.

Furthermore, according to the present disclosure, since such high adhesive force between the first and second porous sub-supports 11 and 12 is acquired without separately using an adhesive and/or a hot press process, any deterioration of ion conductivity which might be caused due to the use of an adhesive and/or hot press for bonding the supports can be prevented. Consequently, the polymer electrolyte membrane 100 according to the embodiment of the present disclosure may have excellent mechanical properties without degradation in performance, such as ionic conductivity.

That is, the polymer electrolyte membrane 100 according to the present disclosure is distinguished from a stacked type polymer electrolyte membrane manufactured by preparing two or more polymer electrolyte membranes and bonding them to each other by an adhesive and/or hot press, in that a resin layer formed only of an ionomer is not included between the first and second porous sub-supports 11 and 12. Unlike the present disclosure, in the stacked type polymer electrolyte membrane, (i) deterioration of ionic conductivity due to the adhesive and/or hot press is inevitably caused, as previously described, and (ii) a resin layer formed only of an ionomer is present between the porous supports, whereby resistance to movement of hydrogen gas is relatively lowered, and thus chemical durability is remarkably reduced due to relatively high hydrogen crossover.

As previously described, the first and second porous sub-supports 11 and 12 may be the same kind of supports or different kinds of supports. For example, both the first and second porous sub-supports 11 and 12 may be e-PTFE films or nonwoven webs.

In general, the e-PTFE film is an anisotropic film having a non-negligible difference between mechanical properties (e.g., tensile strength and elongation) thereof in an expansion direction and mechanical properties (e.g., tensile strength and elongation) thereof in a direction perpendicular to the expansion direction. For this reason, when both the first and second porous sub-supports 11 and 12 are e-PTFE films, the second porous sub-support 12 may be added onto the first porous sub-support 11 such that expansion directions thereof are perpendicular to each other, whereby it is possible to further improve mechanical properties of the polymer electrolyte membrane 100.

The step of applying a second mixed liquid including a second ionomer 22 to the second porous sub-support 12 such that the second porous sub-support 12 becomes entirely wet state may include (i) a step of, when the first ionomer 21 and the second ionomer 22 are identical to each other, adding the second porous sub-support 12 on the first porous sub-support 11 and immersing the first and second porous sub-supports 11 and 12 in the second mixed liquid or (ii) a step of applying the second mixed liquid to an exposed surface of the second porous sub-support 12 using a method, such as bar coating, comma coating, slot-die coating, screen printing, spray coating, doctor blade coating, and so on.

Each of the first and second mixed liquids may be a solution or a dispersion in which the first ionomer 21 or the second ionomer 22 is dissolved or dispersed in water, a hydrophilic solvent, an organic solvent, or a mixed solvent of two or more thereof.

The hydrophilic solvent may have at least one functional group selected from the group consisting of alcohol, isopropyl alcohol, ketone, aldehyde, carbonate, carboxylate, carboxylic acid, ether, and amide, each of which includes straight-chain or branched-chain saturated or unsaturated hydrocarbon having a carbon number ranging from 1 to 12 as the main chain thereof. Each thereof may include an aliphatic or aromatic cyclic compound as at least a portion of the main chain thereof.

The organic solvent may be N-methylpyrrolidone, dimethyl sulfoxide, tetrahydrofuran, or a mixture of two or more thereof.

In order to completely fill the pores of the first and second porous sub-supports 11 and 12 with the first ionomer 21 or the second ionomer 22, various factors, such as temperature and time, may be appropriately adjusted. For example, at least one of thicknesses of the first and second porous sub-supports 11 and 12, concentrations of the first and second mixed liquids, and kind of the solvent/dispersion medium may be appropriately adjusted.

The step of drying the jointed first and second porous sub-supports 11 and 12 may include a primary drying at 60° C. to 150° C. for 15 minutes to 1 hour and a secondary drying at 150° C. to 190° C. for 3 minutes to 1 hour. Specifically, the primary drying may be performed at 60° C. to 120° C. for 15 minutes to 1 hour, and the secondary drying may be performed at 170° C. to 190° C. for 3 minutes to 1 hour. If the primary drying temperature is lower than 60° C. or the primary drying time is shorter than 15 minutes, the solvent/dispersion medium may not be primarily discharged, and it is not possible to obtain a highly dense membrane. If the secondary drying temperature is higher than 190° C. or the secondary drying time is longer than 1 hour, the ion exchange group (e.g., the sulfonic acid group) may be decomposed and the performance of the membrane may be degraded.

Optionally, the polymer electrolyte membrane 100 according to the present disclosure may include more than two porous sub-supports in consideration of specific physical properties that are required, although the polymer electrolyte membrane 100 illustrated in FIG. 1 includes only two porous sub-supports 11 and 12.

In another embodiment of the present disclosure, the polymer electrolyte membrane 100 may include a single porous support 10 instead of a plurality of porous sub-supports 11 and 12, and an ionomer dispersion with which pores of the single porous support 10 are to be filled may be prepared by adding an ionomer to a solvent and mixing the same using a resonant acoustic wave method. The ionomer dispersion thus obtained has high dispersion stability.

High pressure may be applied to a mixture obtained using the resonant acoustic wave mixing, in order to further increase dispersion stability of the ionomer dispersion.

In the present disclosure, the ionomer dispersion having high dispersion stability means an ionomer dispersion having a viscosity ratio defined by Equation 5 below of 1.7 or less and a shear stress ratio defined by Equation 6 below of 1.5 or less, wherein the viscosity and shear stress of the ionomer dispersion are measured using a rheometer while a shear rate is increased from 0.001 s$^{-1}$ to 1000 s$^{-1}$ and then decreased from 1000 s$^{-1}$ to 0.001 s$^{-1}$.

Viscosity ratio=$\eta 2/\eta 1$ [Equation 5]:

(Where $\eta 1$ indicates first viscosity of the ionomer dispersion at the shear rate of 1 s$^{-1}$, measured while the shear rate is increased, and $\eta 2$ indicates second viscosity of the ionomer dispersion at the shear rate of 1 s$^{-1}$, measured while the shear rate is decreased.)

Shear stress ratio=$\sigma 2/\sigma 1$ [Equation 6]:

(Where $\sigma 1$ indicates first shear stress, which is shear stress at the shear rate is 1 s$^{-1}$, measured while the shear rate is increased, and $\sigma 2$ indicates second shear stress, which is shear stress at the shear rate is 1 s$^{-1}$, measured while the shear rate is decreased.)

An ionomer dispersion having sufficiently high dispersion stability while containing high-content ionomer solids may optimize morphology of the ionomer in the polymer electrolyte membrane 100, whereby it is possible to improve both ionic conductivity and durability of the polymer electrolyte membrane 100. That is, the polymer electrolyte membrane 100 may have excellent mechanical durability, such as an MD tear strength of 150 N/mm or more, a TD tear strength of 150 N/mm or more, a stab initial strain of 8% or less, and a stab final strain of 10% or less, and may have an in-plane ionic conductivity of 0.03 to 0.1 S/cm and a through-plane ionic conductivity of 0.03 to 0.1 S/cm under conditions of 80° C. and 50% RH.

Specifically, the ionomer dispersion having high dispersion stability has excellent impregnability and small and uniform particle size. As such, when the porous support 10 is impregnated or coated with the ionomer dispersion to form a reinforced composite membrane type polymer electrolyte membrane 100, a water channel, which provides a moving path for hydrogen ions, is well formed in the through-plane direction as well as the in-plane direction, whereby it is possible to improve ionic conductivity of the polymer electrolyte membrane 100 in both the in-plane direction and the through-plane direction.

Obviously, the ionomer dispersion having high dispersion stability may also be applied to a polymer electrolyte membrane 100 having a plurality of porous sub-supports 11 and 12.

The membrane-electrode assembly according to the present disclosure includes an anode, a cathode, and the polymer electrolyte membrane 100 disposed between the anode and the cathode. The membrane-electrode assembly is identical to a general membrane-electrode assembly for fuel cells except that the polymer electrolyte membrane 100 according to the present disclosure is used as a polymer electrolyte membrane, and therefore a detailed description thereof will be omitted from this specification.

Hereinafter, examples of the present disclosure will be described in detail with reference to the accompanying drawings such that the examples of the present disclosure can be easily implemented by a person having ordinary skill in the art to which the present disclosure pertains. However, the present disclosure may be realized in various different forms, and is not limited to the examples described herein.

MANUFACTURING EXAMPLES:
MANUFACTURE OF POLYMER
ELECTROLYTE MEMBRANE

Example 1

A first porous sub-support (e-PTFE, pore size: 0.10 μm to 0.15 μm, thickness: 6 μm, and ratio of MD tensile elongation to TD tensile elongation: 1.1) was wetted with a first ionomer dispersion ("resonant acoustic wave mixing+high-pressure dispersion", viscosity ratio: 1.01, and shear stress ratio: 1.01) including 20 wt % of a highly fluorinated polymer having an equivalent weight (EW) of 800 g/eq.

A second porous sub-support (e-PTFE, pore size: 0.10 μm to 0.15 μm, thickness: 6 μm, and ratio of MD tensile elongation to TD tensile elongation: 1.1) was added on the first porous sub-support support of wet state such that extension directions thereof intersected each other.

A second ionomer dispersion ("resonant acoustic wave mixing+high-pressure dispersion", viscosity ratio: 1.01, and shear stress ratio: 1.01) including 20 wt % of a highly fluorinated polymer having an equivalent weight (EW) of 800 g/eq was additionally applied to the second porous sub-support added on the first porous sub-support.

Subsequently, the first porous sub-support and the second porous sub-support were dried at 60° C. for 1 hour and then dried at 150° C. for 30 minutes to obtain a polymer electrolyte membrane.

Example 2

A first porous sub-support (e-PTFE, pore size: 0.10 μm to 0.15 μm, thickness: 6 μm, and ratio of MD tensile elongation to TD tensile elongation: 1.2) was wetted with a first ionomer dispersion (resonant acoustic wave mixing, viscosity ratio: 1.26, and shear stress ratio: 1.09) including 20 wt % of a highly fluorinated polymer having an equivalent weight (EW) of 800 g/eq.

A second porous sub-support (e-PTFE, pore size: 0.10 μm to 0.15 μm, thickness: 6 μm, and ratio of MD tensile elongation to TD tensile elongation: 1.2) was added onto the first porous sub-support support of wet state such that extension directions thereof intersected each other. At this time, the first porous sub-support and the second porous sub-support were stacked such that the extension direction of the first porous sub-support and the extension direction of the second porous sub-support were perpendicular to each other.

A second ionomer dispersion (resonant acoustic wave mixing, viscosity ratio: 1.26, and shear stress ratio: 1.09) including 20 wt % of a highly fluorinated polymer having an equivalent weight (EW) of 800 g/eq was additionally applied to the second porous sub-support added on the first porous sub-support.

Subsequently, the first porous sub-support and the second porous sub-support were dried at 60° C. for 1 hour and then dried at 150° C. for 30 minutes to manufacture a polymer electrolyte membrane.

[Measurement of Physical Properties of Polymer Electrolyte Membrane]

MD tear strength, TD tear strength, stab initial strain, stab final strain, in-plane ionic conductivity, and through-plane ionic conductivity of each of the polymer electrolyte membranes according to the above examples were measured using the following methods, and the results are shown in Table 1 below.

* MD/TD Tear Strength

A sample of 50 mm×50 mm was taken, and the maximum force applied to the sample in an MD/TD direction until the sample was torn was measured under the following conditions according to ASTM D624 using a universal test machine (UTM) (Instron 5966).

Temperature: 23±2° C.
Relative humidity: 50±5%
Test speed: 500±50 mm/min

Subsequently, MD/TD tear strength of the sample was calculated using Equation 3 below.

$$TS=F/d$$ [Equation 3]:

Where TS indicates MD/TD tear strength (N/mm) of the sample, F indicates the maximum force (N) applied to the sample, and d indicates a median thickness (mm), which is the arithmetic mean of thicknesses of the sample measured at three points of the sample in a central portion thereof.

According to the aforementioned manner, MD/TD tear strengths of five samples were respectively measured, and the arithmetic mean thereof was calculated, whereby MD/TD tear strength of the polymer electrolyte membrane was obtained.

* Stab Initial Strain and Stab Final Strain]

A sample of 50 mm×50 mm was taken, and stab resistance of the sample was measured using a universal test machine (UTM) (Instron 5966). A jig for puncture testing (sample holder and probe) according to ASTM F1342 provided by Instron Company was used as an accessory for repeated stabs. Specifically, stabs (load: 10 N) are repeatedly performed using the probe under the following conditions in the state in which the sample was fixed to the holder (the distance from a base level to the sample: 100 mm), and a decrease in the distance (i.e., "displacement") due to each stab was measured. At this time, displacement when a load of 0.2 N is applied was regarded as a zero point.

Temperature: 23±2° C.
Relative humidity: 50±5%
Mode: Compression mode
Cycle period: 20 times
Test speed: 100 mm/min Strain when stabs (load: 10 N) were repeatedly performed twice using the probe (i.e., "stab initial strain") and strain when stabs (load: 10 N) were repeatedly performed 20 times using the probe (i.e., "stab final strain") were calculated by Equations 1 and 2 below, respectively.

$$IS(\%)=[(D_2-D_1)/D_1]\times 100$$ [Equation 1]:

$$FS(\%)=[(D_{20}-D_1)/D_1]\times 100$$ [Equation 2]:

Where IS indicates stab initial strain, FS indicates stab final strain, $D_1$ indicates displacement (mm) due to a first stab, $D_2$ indicates displacement (mm) due to a second stab, and $D_{20}$ indicates displacement (mm) due to a twentieth stab.

* In-Plane Ionic Conductivity

In-plane ionic conductivity of the polymer electrolyte membrane 100 was measured at 80° C. and 50% RH using a magnetic suspension balance apparatus (Bell Japan Company).

* Through-Plane Ionic Conductivity

Through-plane ionic conductivity of the polymer electrolyte membrane 100 was measured using a through-plane membrane test system (Scribner Associates, MTS 740) according to a constant current four-terminal method. Specifically, an alternating current potential difference generated in a sample (10 mm×30 mm) was measured while applying alternating current to opposite sides of the sample under conditions of 80° C. and 50% RH to obtain membrane resistance R (a). Subsequently, through-plane ionic conductivity of the polymer electrolyte membrane 100 was calculated using Equation 4 below.

$$\sigma=L/R\times A]$$ [Equation 4]:

(Where σ indicates through-plane ionic conductivity (S/cm), L indicates the distance (cm) between electrodes, R indicates membrane resistance (a), and A indicates effective area (cm²) of the membrane.)

[Measurement of Wet/Dry Cycles of Membrane-Electrode Assembly (MEA)]

A membrane-electrode assembly (MEA) was manufactured using the polymer electrolyte membrane, and wet/dry cycles of the membrane-electrode assembly were measured according to the NEDO protocol. Specifically, wet/dry cycles each constituted by humidification (150% RH, 2 minutes) and drying (0% RH, 2 minutes) were repeated while nitrogen gas was injected to an anode and a cathode at a flow rate of 800 NmL/min. Hydrogen crossover of the MEA was measured at every 1000 cycles using linear sweep voltammetry (LSV). Specifically, a 0.2-0.5 V section was swept at a scan rate of 0.5 mV/s to extract current density data of a 0.4-0.5 V section while hydrogen gas was injected to the anode at a flow rate of 200 NmL/min and nitrogen gas was injected to the cathode at a flow rate of 200 NmL/min at 80° C. and 100% RH. Linear fitting of the data was performed to acquire a current density value of a section having a voltage of 0. When the measured hydrogen crossover was 10 or more times the initial hydrogen crossover, evaluation was finished, and the number of cycles performed until then was taken as wet/dry cycles of the MEA. For example, when the hydrogen crossover measured after a total of 15,000 cycles is completed is less than 10 times the initial hydrogen crossover but the hydrogen crossover measured after a total of 16,000 cycles is completed is 10 or more times the initial hydrogen crossover, the wet/dry cycles of the MEA is "15,000 cycles or more".

TABLE 1

|  | Example 1 | Example 2 |
| --- | --- | --- |
| MD tear strength (N/mm) | 225 | 171 |
| TD tear strength (N/mm) | 250 | 160 |
| Stab initial strain (%) | 4.4 | 5.0 |
| Stab final strain (%) | 5.5 | 6.3 |
| MEA wet/dry cycle (cycles) | 40,000 or more | 30,000 or more |
| In-plane ionic conductivity (S/cm) | 0.046 | 0.048 |
| Through-plane ionic conductivity (S/cm) | 0.042 | 0.038 |

The invention claimed is:

1. A polymer electrolyte membrane comprising a composite layer comprising (i) a porous support and (ii) first and second ionomers,
wherein the porous support comprises:
a first porous sub-support having first pores; and
a second porous sub-support having second pores,
wherein the first and second porous supports are in contact with each other,
wherein the first pores are filled with the first ionomer,
wherein a portion of the second pores adjacent to the first porous sub-support are filled with the first ionomer while a remainder of the second pores are filled with the second ionomer, such that an interface between the first and second ionomers is present in the second porous sub-support,
wherein the polymer electrolyte membrane has an MD tear strength of 150 N/mm or more, a TD tear strength of 150 N/mm or more, a stab initial strain of 8% or less, and a stab final strain of 10% or less, wherein the stab initial strain and stab final strain of the polymer electrolyte membrane are obtained by a method comprising:
taking a sample of 50 mm×50 mm from the polymer electrolyte membrane;
fixing the sample to a holder for puncture testing according to ASTM F1342;
repeatedly stabbing the sample with a probe for puncture testing according to ASTM F1342 under compression mode at a stab load of 10 N, temperature of 23±2° C., relative humidity of 50+5%, cycle period of 20 times, and test speed of 100 mm/min;
measuring displacement of the sample after first, second, and twentieth stabs, respectively, wherein displacement due to an initial load of 0.2 N is regarded as a zero point; and
calculating the stab initial strain and the stab final strain according to Equation 1 and Equation 2 below, respectively:

$IS(\%)=[(D_2-D_1)/D_1]\times 100$ [Equation 1]:

$FS(\%)=[(D_{20}-D_1)/D_1]\times 100$ [Equation 2]:

where IS indicates the stab initial strain, FS indicates the stab final strain, $D_1$ indicates displacement caused by the first stab, $D_2$ indicates displacement caused by the second stab, and $D_{20}$ indicates displacement caused by the twentieth stab, and
wherein the polymer electrolyte membrane has an in-plane ionic conductivity of 0.03 to 0.1 S/cm and a through-plane ionic conductivity of 0.03 to 0.1 S/cm under conditions of 80° C. and 50% RH.

2. The polymer electrolyte membrane according to claim 1, wherein the polymer electrolyte membrane has an MD tear strength of 170 to 320 N/mm, a TD tear strength of 160 to 320 N/mm, a stab initial strain of 1 to 6%, and a stab final strain of 2 to 8%.

3. The polymer electrolyte membrane according to claim 1, wherein
the polymer electrolyte membrane further comprises:
a first resin layer disposed on the first porous sub-support, the first resin layer comprising an ionomer identical to the first ionomer; and
a second resin layer disposed on the second porous sub-support, the second resin layer comprising an ionomer identical to the second ionomer.

4. The polymer electrolyte membrane according to claim 3, wherein
a thickness of the polymer electrolyte membrane is 10 to 50 μm, and
a thickness of the composite layer is 30 to 90% of the thickness of the polymer electrolyte membrane.

5. The polymer electrolyte membrane according to claim 1, wherein the porous support further comprises a third porous sub-support in contact with the second porous sub-support.

6. The polymer electrolyte membrane according to claim 1, wherein the first ionomer is identical to or different from the second ionomer.

7. A membrane-electrode assembly comprising:
an anode;
a cathode; and
the polymer electrolyte membrane according to claim 1, the polymer electrolyte membrane being disposed between the anode and the cathode.

* * * * *